United States Patent
Fukuchi et al.

(10) Patent No.: US 7,050,374 B2
(45) Date of Patent: May 23, 2006

(54) OPTICAL DISK APPARATUS

(75) Inventors: Kiyoshi Fukuchi, Tokyo (JP);
Mitsumasa Kubo, Tachikawa (JP)

(73) Assignee: Teac Corporation, Musashino (JP)

( * ) Notice: Subject to any disclaimer, the term of this patent is extended or adjusted under 35 U.S.C. 154(b) by 397 days.

(21) Appl. No.: 10/228,620

(22) Filed: Aug. 26, 2002

(65) Prior Publication Data

US 2003/0039188 A1 Feb. 27, 2003

(30) Foreign Application Priority Data

Aug. 27, 2001 (JP) .................................. 2001-255520

(51) Int. Cl.
*G11B 5/09* (2006.01)

(52) U.S. Cl. ................. 369/47.53; 369/47.5; 369/53.1; 369/59.1

(58) Field of Classification Search ................. 369/47.1, 369/47.15, 47.27, 47.5, 47.51, 47.52, 47.53, 369/47.54, 47.55, 53.1, 53.2, 59.1, 59.11, 369/116
See application file for complete search history.

(56) References Cited

U.S. PATENT DOCUMENTS

| 5,216,660 | A | 6/1993 | Iimura |
| 5,872,763 | A | 2/1999 | Osakabe |
| 6,621,780 | B1 * | 9/2003 | Suzuki ..................... 369/47.53 |
| 6,778,478 | B1 * | 8/2004 | Mashimo et al. ........ 369/47.53 |

FOREIGN PATENT DOCUMENTS

| JP | 40-10237 | 1/1992 |
| JP | 10-064064 | 3/1998 |
| JP | 2000-137918 | 5/2000 |
| KR | 2001-0003547 | 1/2001 |
| WO | WO 98/25267 | 6/1998 |

* cited by examiner

*Primary Examiner*—Muhammad Edun
(74) *Attorney, Agent, or Firm*—Christensen O'Connor Johnson Kindness PLLC

(57) ABSTRACT

An optical disk apparatus for recording test data onto an optical disk while changing the level of recording power and determines the optimum recording power with reference to the quality of a reproduced signal of the test data. A modulation degree or a γ value is calculated from a reproduced signal of the test data, and the gradient of a change of the modulation degree or the γ value relative to the recording power Pw is calculated. Further, a target recording power is determined utilizing an area where the gradient of the change is relatively sharp, and the optimum recording power is determined based on the target recording power.

19 Claims, 9 Drawing Sheets

OPTICAL DISK APPARATUS

FIELD OF THE INVENTION

The present invention relates to an optical disk apparatus, and in particular to optimization of recording power for recording data onto a recordable optical disk.

BACKGROUND OF THE INVENTION

OPC is known as a conventional technique for optimizing recording power. According to the OPC technique, test data is recorded onto an area of an optical disk known as a Power Calibration Area, or PCA, while changing the level of the recording power. Specifically, a power function (γ) is calculated using a reproduced RF signal relating to data for test recording, and recording power at a level which results in the calculated power function, or a γ value, having a predetermined target value (a target recording power) is then calculated. Further, using the calculated target recording power, the optimum recording power is determined. A γ value is defined as Expression 1, based on a modulation degree m of a reproduced RF signal, and recording power Pw.

$$\gamma = (dm/dPw)/(m/Pw) \quad (1)$$

The right side (dm/dPw) of Expression 1 above is a value obtained by differentiating a modulation degree m by recording power Pw.

In actuality, a target γ, a parameter ρ for use in calculation of the optimum recording power based on a target recording power, an erasing/recording power ratio e, an erasing/recording power ratio compensation coefficient for low speed recording κ, and so forth are recorded in a read-in area on an optical disk, and read out for use in determination of the optimum recording or erasing power.

That is, using a target recording power Pwt, which can produce a target γ value, the following Expressions (2) to (4) are obtained.

$$Pwo = \rho \cdot Pwt \quad (2)$$

$$Peo = e \cdot Pwo \quad (3)$$

$$Peo' = \kappa Pwo \quad (4)$$

In these expressions, Pwo is the optimum recording power, Peo is the optimum erasing power for twice or four time speed, and Peo' is the optimum erasing power for a normal speed.

These values, including a target γ value, a parameter ρ, a power ratio e, and so forth, as determined from an optical disk manufacture under conditions of 25° C., a standard or slower speed, and a laser wavelength 785 nm, are recorded onto a manufactured optical disk.

However, because a modulation degree m for use in calculation of a γ value contains an error due to variation of in-plane sensitivity of a recording film of an optical disk, an error-contained γ value is generally resulted due to the error. This makes it difficult to uniquely determine a target recording power based on a target γ value designated by an optical disk manufacturer, and also difficult to accurately determine the optimum recording power.

FIG. 9 is a graph showing modulation degrees m relative to recording power at respective levels, and variation of a γ value calculated based on a modulation degree using Expression (1). The abscissa of the graph corresponds to a recording power Pw for test recording, while the left ordinate corresponds to a modulation degree m and the right ordinate corresponds to a γ value.

Because of an error contained in a modulation degree m, calculated γ values may fluctuate in the vicinity of a target γ value, which is here set, as an example, at 1.3, as shown in the drawing. That is, a unique level of recording power Pw which produces a target γ value can not readily be determined, if at all.

For example, in the example of FIG. 9, recording power levels P0, P1, P2, and P3 are candidates for the recording power level which can produce a target γ value, or a γ target. As such, the obtained optimum recording power will significantly vary depending on which one of the candidates is chosen for the calculation. In other words, it is difficult to determine the inherent optimum level in this method, which makes it difficult to maintain preferable recording quality (a wave jitter, an error rate, and so forth). Specifically, recording power at a level significantly lower than the inherent optimum level may adversely affect jitter and error rate, while recording power at a level significantly higher than the inherent optimum level may adversely affect reliability for repetitive recording.

SUMMARY OF THE INVENTION

The present invention aims to achieve accurate determination of the optimum recording power, even if a modulation degree m contains some error.

According to one aspect of the present invention, there is provided an optical disk apparatus, comprising means for recording test data onto a predetermined area on the optical disk while changing a level of recording power; means for reproducing the test data to calculate a modulation degree for the recording power at each level; and means for setting an optimum recording power based on gradient of a change of the modulation degree relative to the recording power.

Specifically, the gradient of a change of a modulation degree relative to recording power can be uniquely determined for each optical disk, even when the modulation degree contains some error. Therefore, use of the gradient of a change of a modulation degree relative to recording power allows unique determination of the optimum recording power.

In one embodiment of the present invention, recording power at a level corresponding to a point of inflection at which the gradient of a change of a modulation degree relative to recording power alters may be determined as a target recording power, and the optimum recording power may be determined based on the target recording power.

In another embodiment of the present invention, recording power at a level which produces a modulation degree 0 is calculated through extrapolation utilizing the gradient of a change of a modulation degree relative to recording power in an area where the gradient is sharp, so that the resultant recording power is determined as a target recording power, and the optimum recording power is determined using the recording power at the calculated level as the target recording power.

According to another aspect of the present invention, there is provided an optical disk apparatus comprising means for recording test data onto a predetermined area on the optical disk while changing a level of recording power; means for reproducing the test data to calculate a γ value for the recording power at each level; and means for setting an optimum recording power based on gradient of a change of the γ value relative to the recording power.

Specifically, the gradient of a change of a γ value relative to recording power can be uniquely determined for each optical disk even if the γ value contains some error. Therefore, use of the gradient of a change of a γ value relative to recording power allows unique determination of the optimum recording power.

The present invention is applicable to optical disk apparatuses capable of data recording, such as a CD-R drive, CD-RW drive, a DVD-R drive, a DVD-RW drive, and so forth.

The present invention will be more clearly understood with reference to the description of embodiments described below, but to which the present invention is not limited.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

In the following, embodiments of the present invention will be described based on the accompanying drawings.

Figure 1:
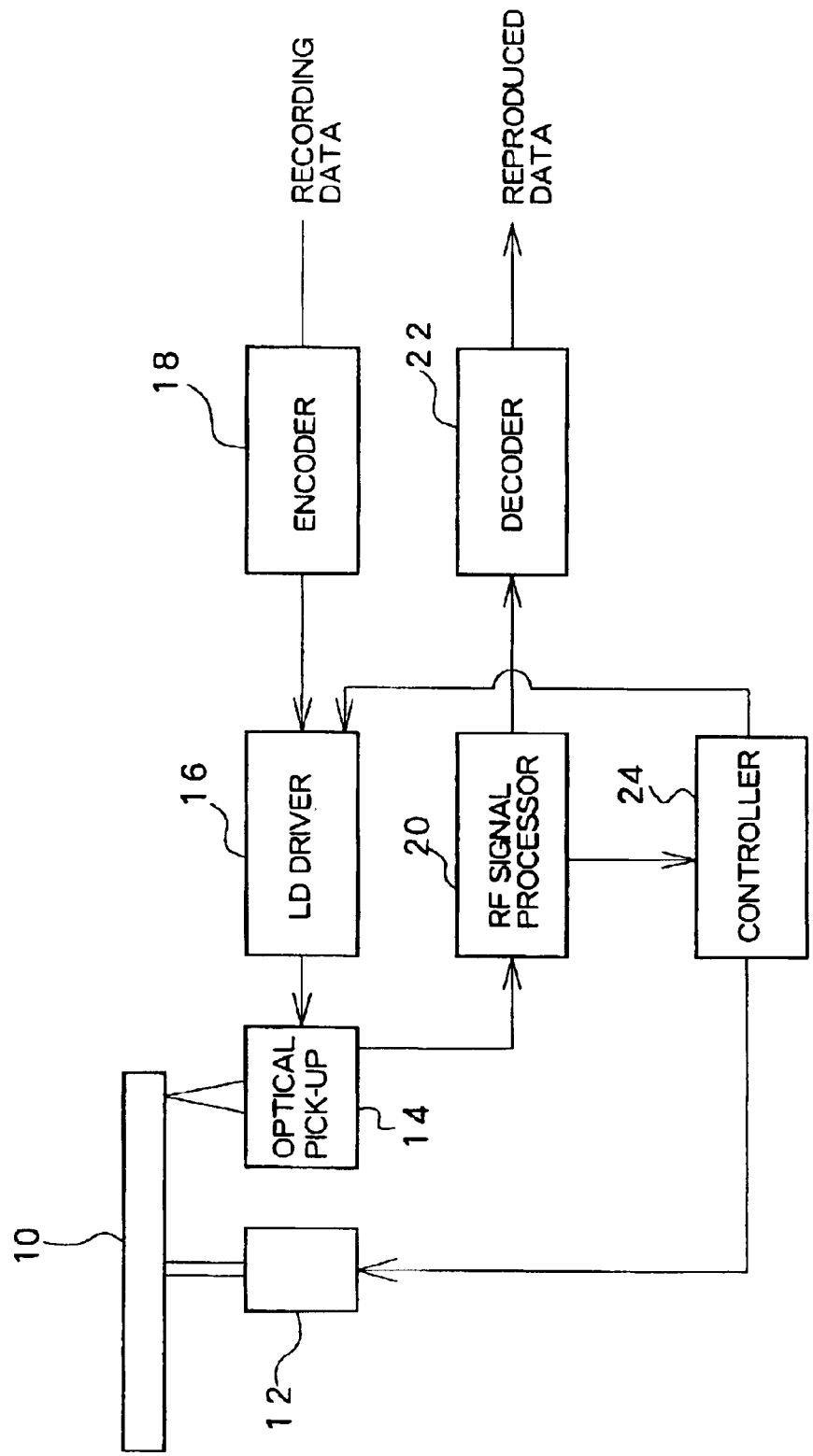
FIG. 1 is a block diagram showing a structure of an optical disk apparatus according to the present invention.

FIG. 1 is a block diagram showing major elements of an optical disk apparatus according to a first embodiment of the present invention.

An optical disk 10 is subjected to CLV or CAV control by a spindle motor 12. Opposing-the optical disk 10 is an optical pick-up 14, which projects a recording power laser beam supplied from a laser diode (LD) toward the optical disk 10 to record data onto the optical disk 10. The optical pick-up 14 also projects a reproducing power laser beam, similarly supplied from the LD, toward the optical disk 10 to read out data from the optical disk 10. With a data rewritable optical disk 10, an erasing power laser beam, supplied from the LD, is projected toward the optical disk 10 to erase data recorded on the optical disk 10 (reproducing power<erasing power<recording power). Methods for recording data recording onto an optical disk 10 may be divided into two types, one in which a recording power laser beam is projected toward the optical disk 10 to fuse and sublime a recording film on the optical disk 10 for formation of pits thereon, and another in which the recording film in crystalline state is heated and then rapidly cooled for conversion into an amorphous state. Either method can be used in conjunction with this embodiment.

For data erasure, an erasing power laser beam is applied for restoration of a crystal state from the amorphous state.

For data recording, recording data is encoded in an encoder 18, and supplied to an LD driver 16. The LD driver 16 creates a driving signal based on the encoded recording data, and supplies the resultant signal to the LD in the optical pick-up 14 for data recording. A recording power value to be set in the LD driver 16 is determined according to a control signal from the controller 24. Specifically, prior to actual data recording, test data is recorded onto a PCA area on the optical disk 10 while changing the recording power levels so that the optimum recording power can be determined based on the quality of a signal relating to the test data (OPC).

For data reproduction, the optical pick-up 14 supplies a reproduced RF signal to an RF signal processor 20. The RF signal processor 20, which comprises an RF amplifier, an equalizer, a binarizer, a PLL section, and so forth, processes the received RF signal in these sections, and supplies the result to a decoder 22. The decoder 22 decodes the received binarized RF signal based on a synchronous clock which is generated in the PLL section, and outputs the resultant reproduced data. The RF signal processor 20 supplies an amplified, reproduced RF signal also to a controller 24 for signal quality evaluation.

It should be noted that other circuits which operate for data reproduction, such as a circuit for generating tracking and focus error signals for focus and tracking servo controls, a circuit for reproducing a wobble signal stored in the optical disk 10 for address demodulation or rotation control, and so on, are not described here because these operate similarly to a conventional drive.

Based on the evaluated quality of a reproduced signal relative to the test data, the controller 24 determines the optimum recording power. Specifically, the controller 24 calculates a modulation degree m of a reproduced RF signal supplied from the RF signal processor 20, and determines the optimum recording power based on the gradient of a change of the modulation degree m relative to recording power, rather than calculating a γ value. The controller 24 then supplies the determined optimum recording power to the LD driver 16.

Figure 2:
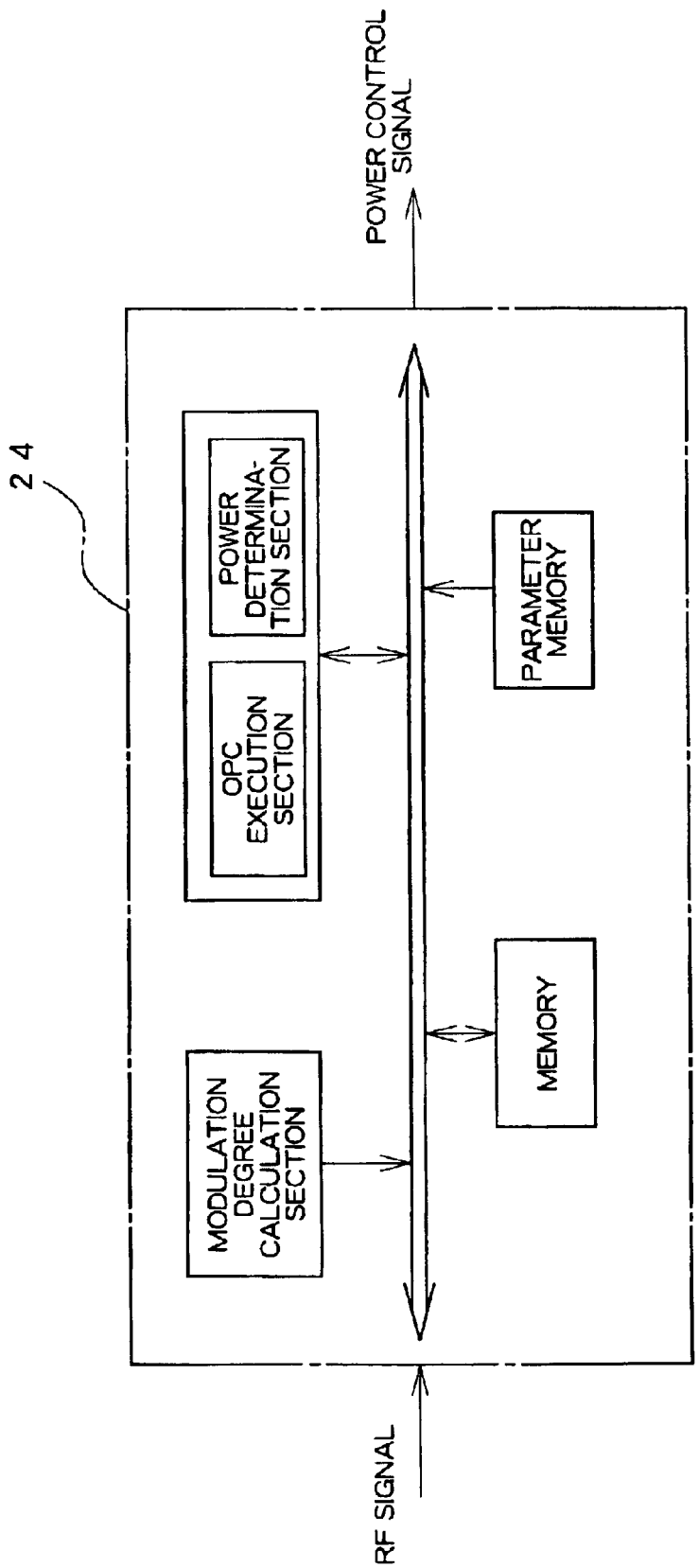
FIG. 2 is a block diagram showing functions of a controller of FIG. 1.

FIG. 2 is a block diagram showing functions of the controller 24 of FIG. 1. The controller 24, which is comprised by a microcomputer, has a modulation degree calculation section, an OPC execution section, a power determination section, a memory, and a parameter memory. The modulation degree calculation section, the OPC execution section, and the power determination section can be realized using a single CPU, while the memory and the parameter memory can be realized using a RAM.

In the controller 24, a reproduced RF signal which. is supplied from the RF signal processor 20 through an interface (not shown) is supplied to the modulation degree calculation section. The modulation degree calculation section calculates, based on the reproduced RF signal, a modulation degree m of a signal having a predetermined frequency, for example, a signal 11T among signals 3T to 11T. Data for the calculated modulation degree m is stored in the memory correlated with data for the recording power PW at each level. The power determination section determines a target recording power based on a change of the stored modulation degree m, and then determines the optimum recording power based on the target recording power using a parameter recorded in the parameter memory.

Figure 3:
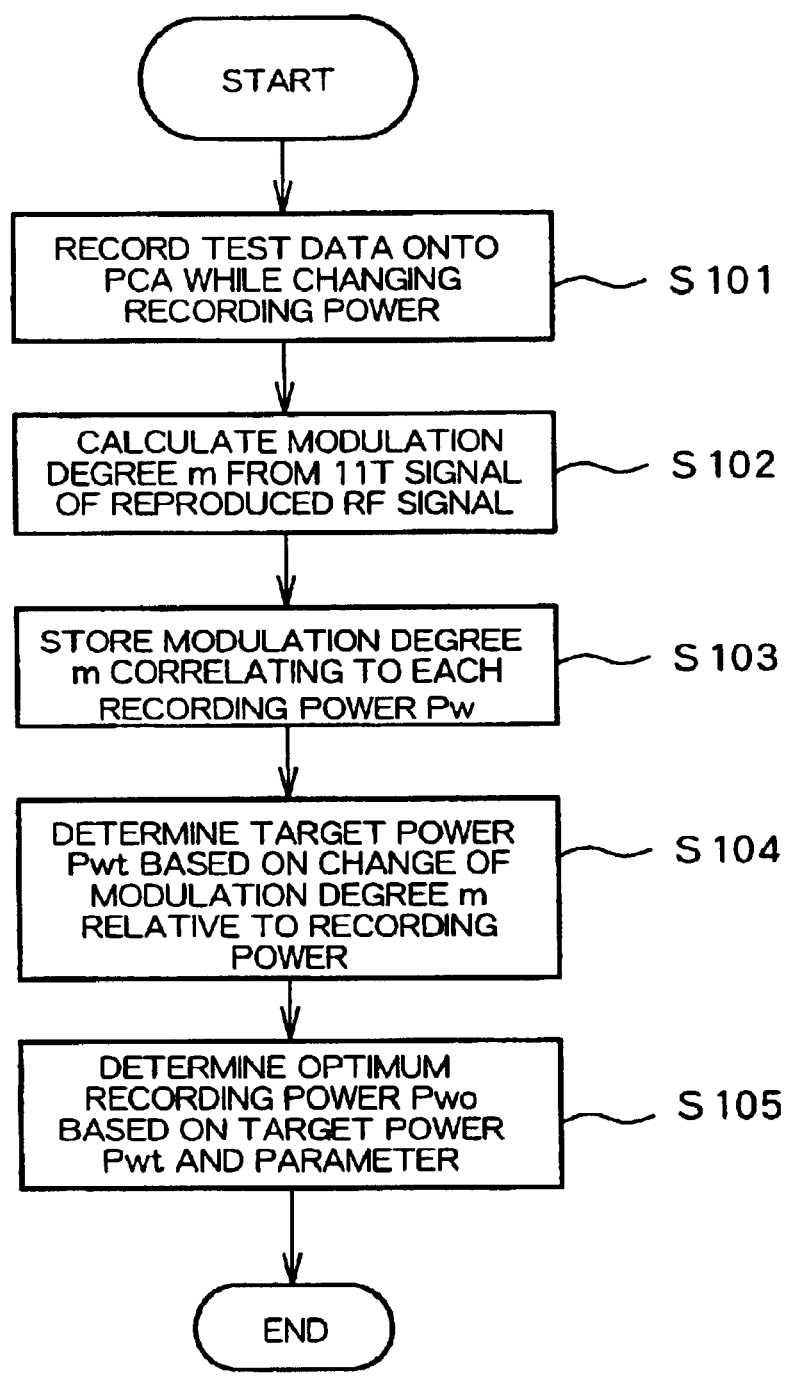
FIG. 3 is a flowchart of processing by the controller.

In the following, the flow of processing will be described in detail with reference to FIG. 3, which is a flowchart of processing by the controller 24.

Initially, the OPC execution section records test data onto a PCA area on the optical disk 10 while changing the levels of recording power Pw (S101). The level of recording power Pw is variable over 14 stages, for example, and recording power at a different level is applied to each sector in the PCA area in test data recording. After test data recording, the modulation degree calculation section of the controller 24 calculates a modulation degree m based on a signal 11T of the reproduced RF signal (S102). Specifically, the peak level Imax and bottom level Imin of a signal 11T are calculated to determine a difference between them, and a modulation degree m is calculated based on the determined difference.

$$m = (Imax - Imin)/Imax$$

A value for each calculated modulation degree m is stored in the memory correlated to the recording power Pw at a corresponding level of OPC (S103). For example, the memory may store recording power at levels Pw1, Pw2, and so forth, and corresponding modulation degrees m1, m2, and so forth, in the form of (Pw1, m1), (Pw2, m2), and so forth.

Thereafter, the power determination section calculates the gradient of a change of a modulation degree mi relative to recording power at a level Pwi (i=1 to 14) which is stored in the memory, and then determines a target recording power Pwt based on the calculated gradient of the change (S104). Further, the optimum recording power Pwo is determined based on the target recording power Pwt and a parameter stored in the parameter memory (S105).

In this embodiment, there are two methods for determining a target power Pwt according to the gradient of a change of a modulation degree relative to recording power. These methods will be described in detail in the following.

Figure 4:
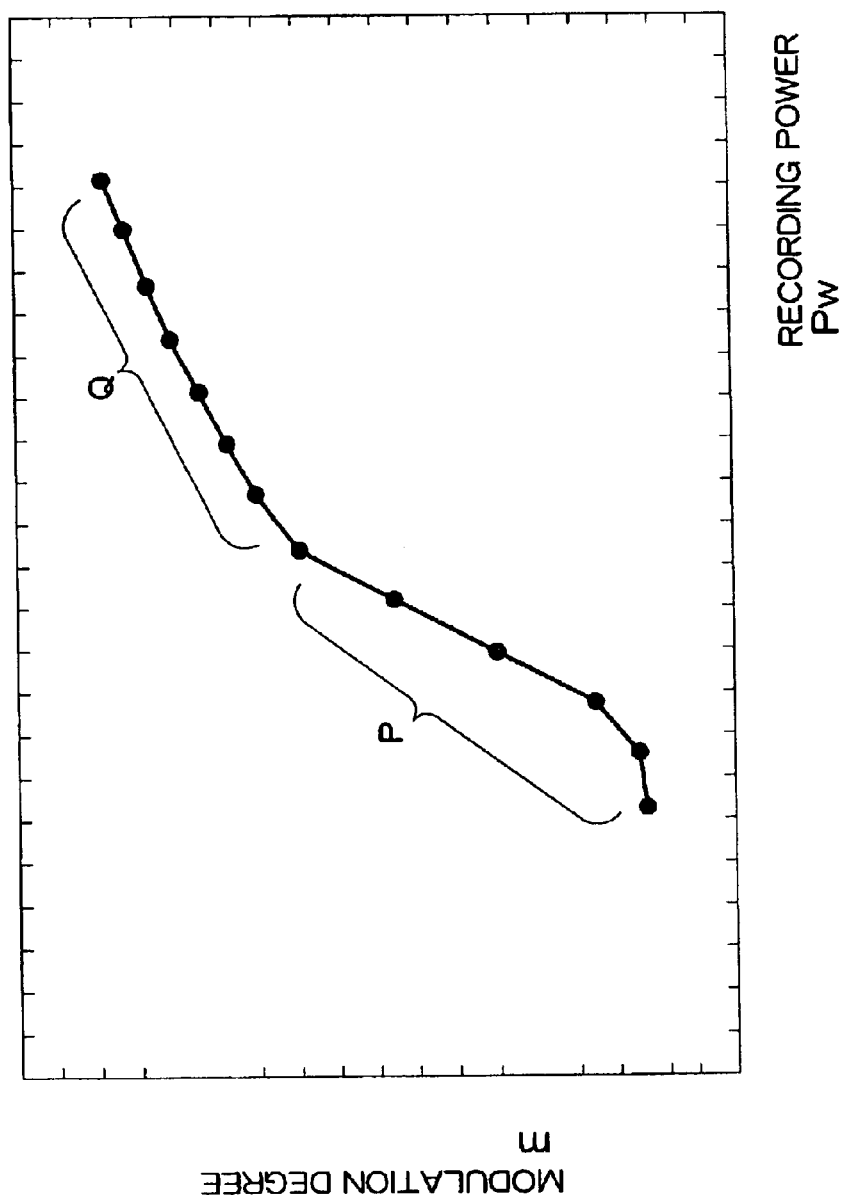
FIG. 4 is a graph showing a change of a modulation degree relative to recording power.

A Method Using a Point at Which Gradient Alters, or a Point of Inflection:

FIG. 4 is a graph showing change of a modulation degree mi relative to recording power at respective levels Pwi stored in a memory in the controller 24. The abscissa of the graph corresponds to recording power Pw, while the ordinate corresponds to a modulation degree m. Generally, a modulation degree m increases for recording power Pw at larger levels. The gradient of a change of a modulation degree m is relatively sharp, substantially linear, in an area with recording power Pw at relatively low levels (Area P), while it is moderate in an area with recording power Pw at relatively high levels (Area Q). That is, there is an area in which a modulation degree m increases largely relative to recording power Pw, in other words, the change in recording power Pw is smaller compared to a change of a modulation degree m. Focusing on this fact, the power determination section determines a target recording power Pwt, utilizing an area where the gradient of a change of a modulation degree m relative to recording power Pw is relatively sharp in comparison with a recording power Pw, in other words, a recording power Pw does not greatly change in comparison with a modulation degree m.

Figure 5:
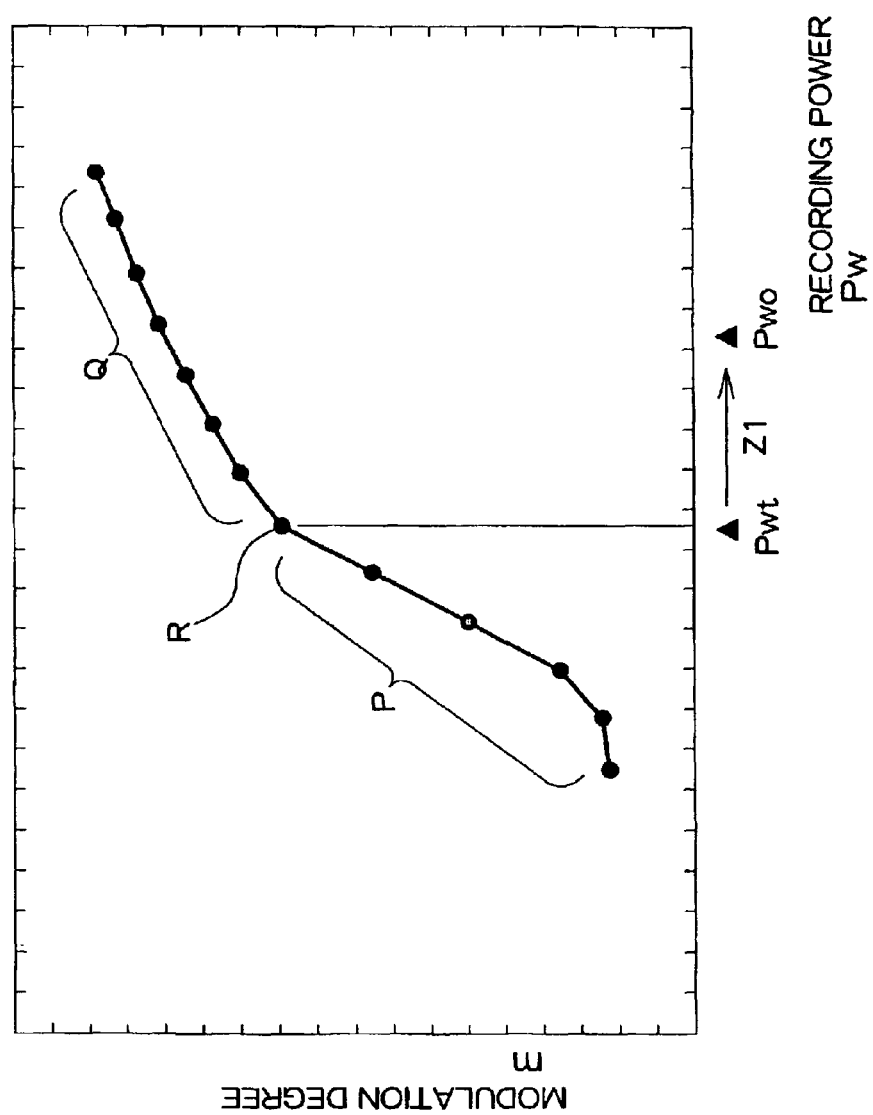
FIG. 5 is a diagram explaining determination of the optimum recording power based on the gradient of a change of a modulation degree.

FIG. 5 shows a specific determination method. That is, because the gradient of a change of a modulation degree m relative to recording power Pw alters from being sharp in one area to being moderate in another, there exists a point at which alteration occurs, referred to as a point of inflection. In FIG. 5, Point R corresponds to a point of inflection of the modulation degree m relative to a recording power Pw. Extracting this point R, the power determination section determines the recording power at a level corresponding to the point R as a target recording power Pwt. Specifically, the power determination section calculates the gradient of the change, which can be obtained as $\Delta m/\Delta Pw$, and extracts a point, as a point of inflection, at which the gradient alters by a predetermined value or greater. The power determination section then determines recording power at a level corresponding to the point of inflection as a target recording power Pwt. Should the point of inflection be located between adjacent levels of recording power among fourteen discrete levels, recording power at the level which is closest to the point of inflection may be determined as the target recording power.

Alternatively, recording power at a level which corresponds to a point of inflection may be calculated through linear interpolation, to be determined as a target recording power.

After determination of a target recording power Pwt, the power determination section multiplies the target recording power Pwt by Parameter z1, which is stored in the parameter memory, to determine the optimum recording power Pwo. That is, $$Pwo = z1 \cdot Pwt \quad (5)$$

Parameter z1 may be predetermined and stored in a read-in-area of the disk by an optical disk manufactures, and the optical pick-up 14 reads it out and stores it in the parameter memory. Alternatively, a parameter may be stored in a memory in a driver, or in a parameter memory, during the process of manufacturing the drive.

Because a point of inflection, or a point at which the gradient of a change alters, can be uniquely determined even if the absolute value of a modulation degree m fluctuates due to an error contained in the modulation degree m, a unique target recording power Pwt can be determined. This in turn makes it possible to determine a unique value for the optimum recording power using Expression 5 based on a target recording power Pwt. Therefore, according to this method, a target γ value is unnecessary, and parameter z1 is used in the place of parameter ρ.

Figure 6:
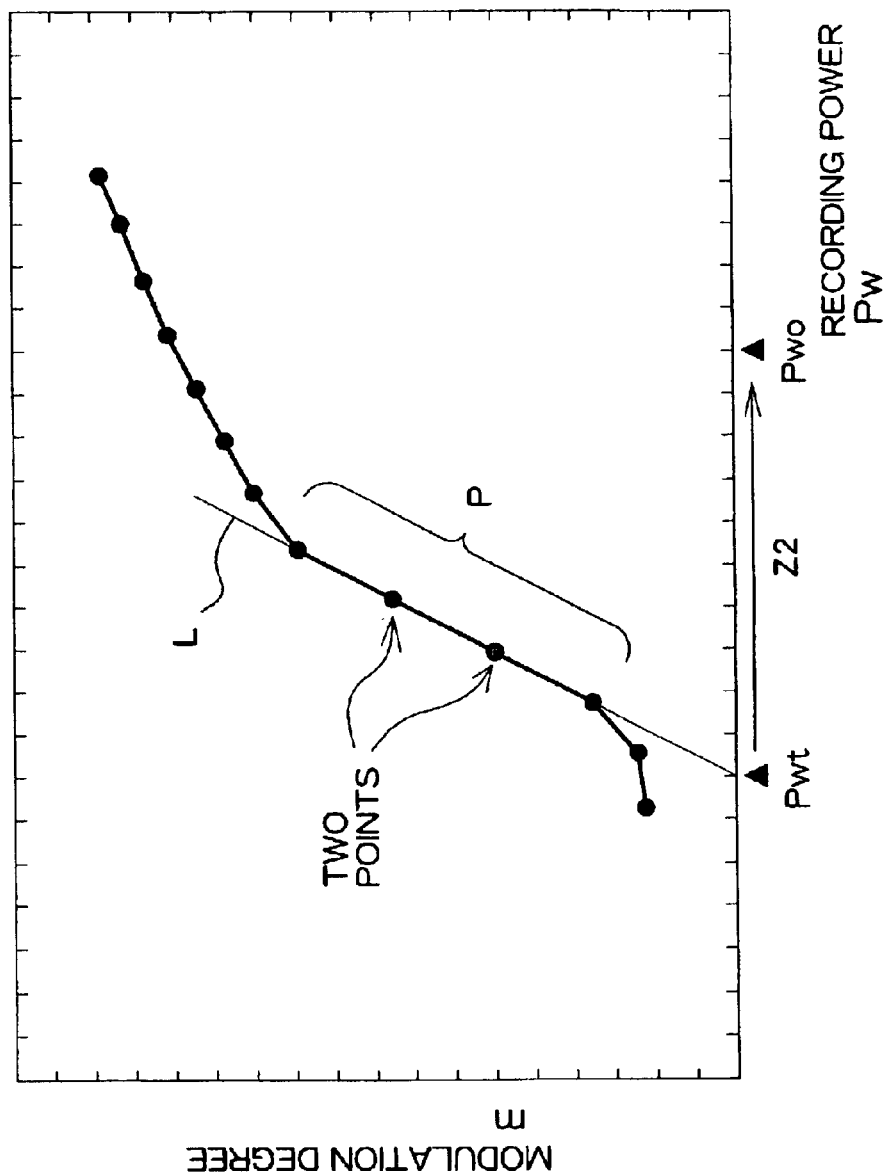
FIG. 6 is another diagram explaining determination of the optimum recording power based on the gradient of a change of a modulation degree.

A Method Using Extrapolation of the Gradient of a Change of a Modulation Degree m:

FIG. 6 shows another method for determining the optimum recording power. The drawing shows, similar to FIG. 4, a change of a modulation degree m relative to recording power Pw at respective levels. Specifically, any two points are extracted from a range with the gradient of the change being substantially linear within Area P with the gradient being sharp, and connected by a straight line L, which is then extended. With this extension, recording power at a level corresponding to the modulation degree m being 0 is obtained.

It should be noted that Area P can be extracted by calculating the gradient of the change $\Delta m/\Delta Pw$ and selecting an area in which the absolute value of the gradient exceeds a predetermined value. It should also be noted that whether or not the gradient is substantially linear can be determined based on whether or not the absolute value of a difference between the gradients of two adjacent changes, $\Delta m/\Delta Pw$, is smaller than a predetermined differential value.

While using the recording power at a level corresponding to a modulation degree m being 0 as a target recording power Pwt, the target recording power Pwt is multiplied by parameter z2, which is stored in the parameter memory, to determine the optimum recording power Pwo.

That is, $$Pwo = z2 \cdot Pwt \quad (6)$$

Parameter z2 can be predetermined and stored in a read-in-area of the disk by an optical disk manufactures. The value is read using the optical pick-up 14 and stored in the parameter memory.

Because the gradient of a change of a modulation degree m relative to recording power can be uniquely determined even if the absolute value of a modulation degree m fluctuates due to an error contained in the modulation degree m, a unique target recording power Pwt can be determined. This in turn makes it possible to determine a unique value for the optimum recording power, using Expression 6 based on target recording power Pwt. That is, according to this method, a target γ value is unnecessary, and parameter z2 is used in the place of parameter ρ.

It should be noted that, whereas any two points are extracted from an area with the gradient of the change being sharp and substantially linear and connected to each other to thereby create a straight line in this example, extraction of points is not limited to the example described. For example, three or more points may be extracted and connected to one another to thereby create a straight line for calculation of recording power at a level which corresponds to a modulation degree m being 0.

It should be noted that, whereas a modulation degree m of test data is calculated and a target recording power, and then the optimum recording power, are calculated based on the gradient of a change of the modulation degree relative to recording power in the above embodiment, a γ value may be calculated based on the modulation degree m so that the optimum recording power can be determined based on the gradient of a change of the γ value.

In the manner of determination of a target recording power based on the absolute value of a γ value (recording power at a level which achieves a target γ value, is determined as a target recording power), it is difficult to uniquely determine a target recording power should the γ value fluctuate due to an error. This in turn makes it difficult to accurately determine the optimum recording power. However, this problems can be addressed when the gradient of a change of a γ value is based on in determination of a target recording power.

Figure 7:
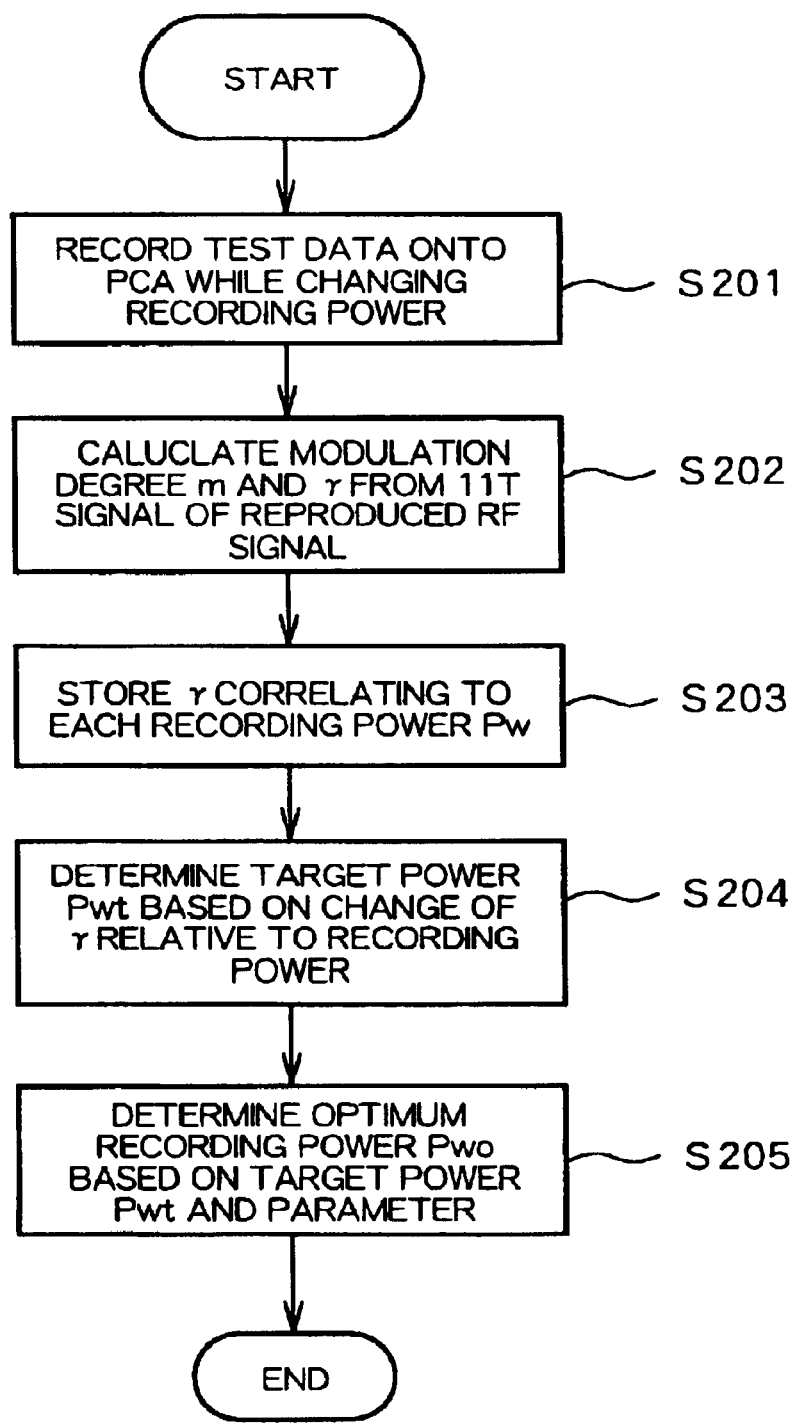
FIG. 7 is a flowchart showing another processing by the controller.

FIG. 7 shows a flowchart of another processing by the controller 24. This process flow differs from that of FIG. 3 in that the power determination section calculates a γ value based on a modulation degree m (S202), and that a target recording power Pwt is determined based on the gradient of a change of the γ value relative to recording power Pw (S204).

Figure 8:
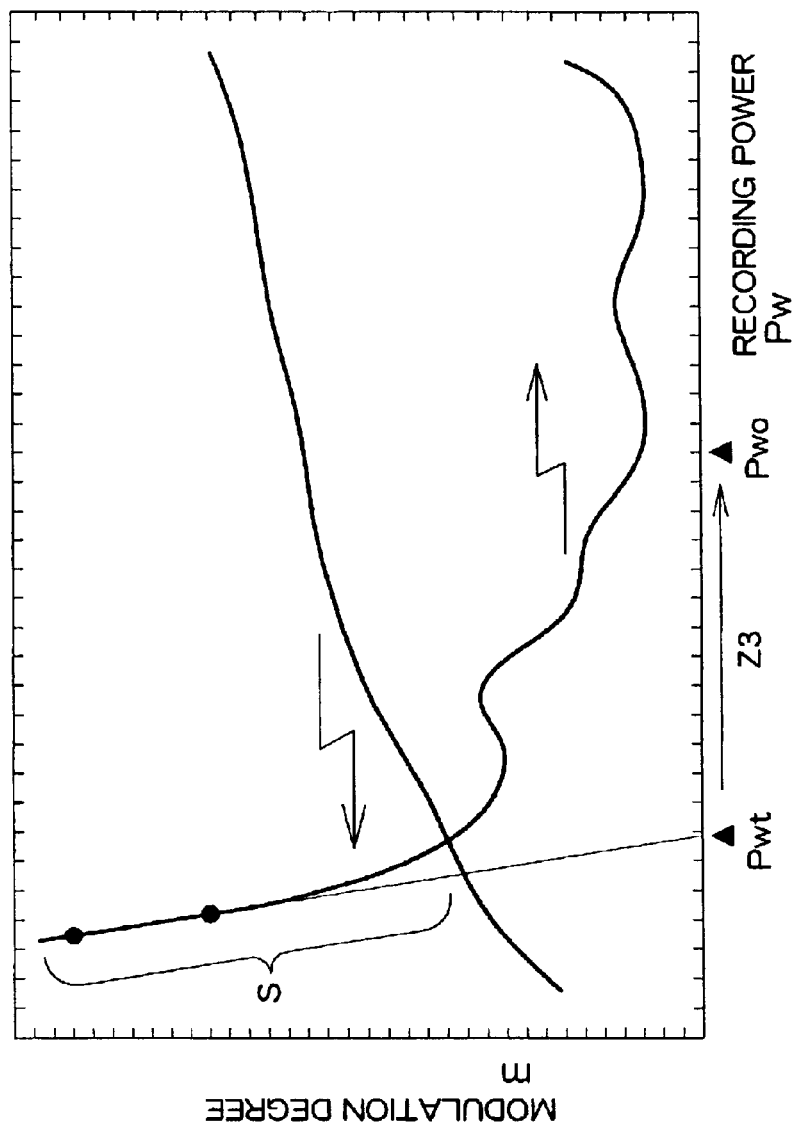
FIG. 8 is a diagram explaining determination of the optimum recording power based on the gradient of a change of a γ value.
Figure 9:
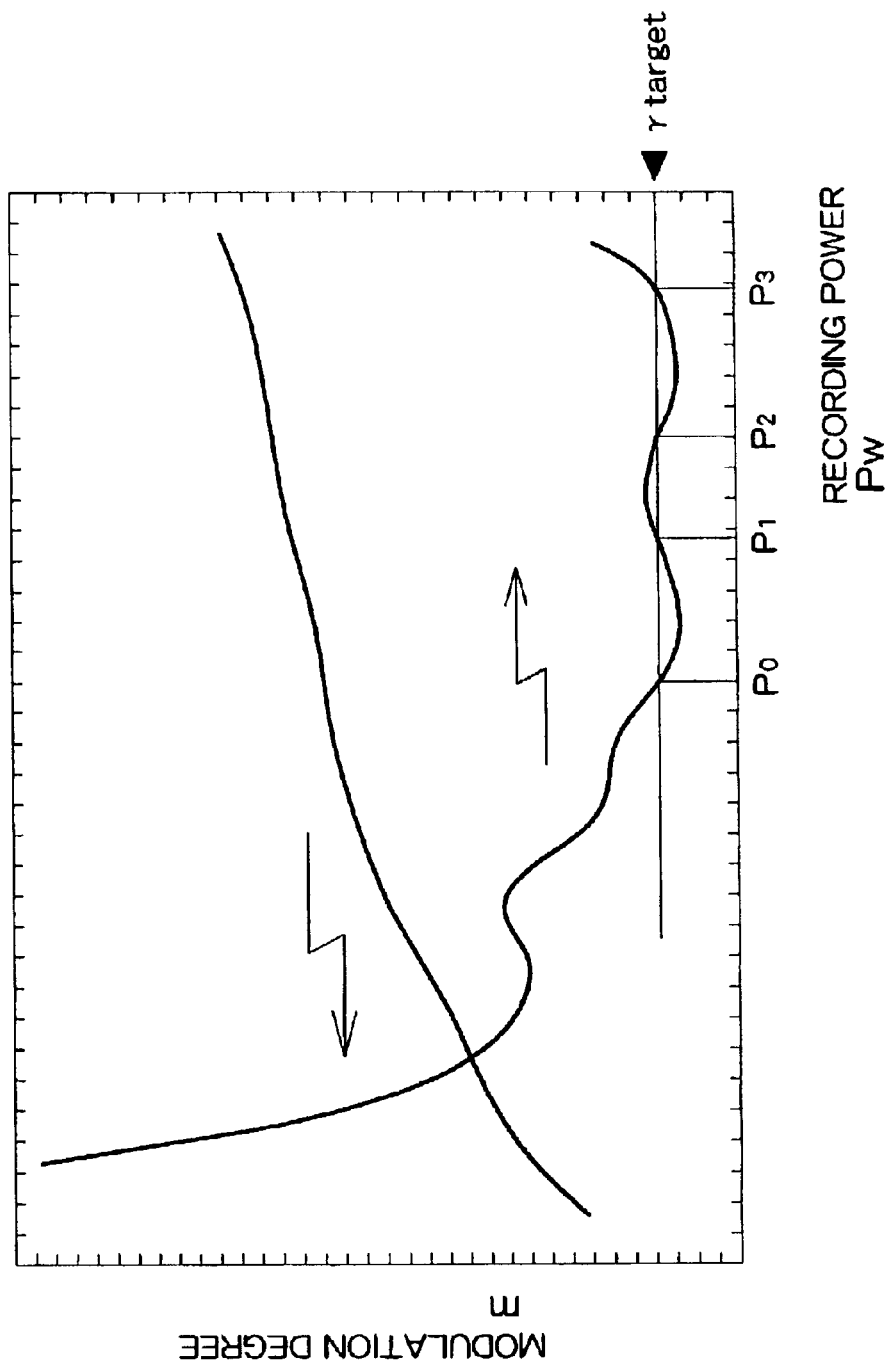
FIG. 9 is a graph showing correlation between recording power and a modulation degree and that between recording power and a γ value.

FIG. 8 shows a method for determining the optimum recording power. The abscissas of the drawing corresponding to recording power Pw, while the left ordinate corresponds to a modulation degree m and the right ordinate corresponds to a γ value.

As shown, while focusing on Area S with the gradient of a change of a γ value being sharp, two points are extracted from a range with the gradient being substantially linear and connected to thereby create a straight line, and recording power at a level Pw which achieves a γ value being 0 is calculated based on the straight line. It should be noted that Area S can be determined by selecting an area where the absolute value of the gradient of a change of a γ value, Δγ/ΔPw, exceeds a predetermined value, and that whether or not the gradient changes substantially linearly can be determined based on whether or not the absolute value of a difference between gradients of adjacent changes, Δγ/ΔPw, is smaller than a predetermined differential value.

While using the calculated recording power as a target recording power Pwt, the target recording power Pwt is multiplied by pre-stored parameter z3 to determine the optimum recording power Pwt.

$$Pwo = z3 \cdot Pwt \quad (7)$$

Parameter z3 also can be predetermined and stored in a read-in-area of the disk by the manufacturer, and the optical pick-up 14 can reads out and store data for this parameter in the parameter memory.

Because the target recording power Pwt can be uniquely determined based on the gradient of a γ value even if the γ value fluctuates due to an error attributed to an error in a modulation degree m, the optimum recording power Pwo can be accurately determined.

As described above, because the optimum recording power is determined based not on the absolute value of a γ value but on the gradient of a change of a modulation degree m or of a γ value in this embodiment, accurate determination free from the influence of either an error in the modulation degree m or fluctuation of its absolute value is achievable. This improves recording quality.

After determination of the optimized recording power, the optimum erasing power can be determined using Expressions 3 and 4 and Parameter e.

It should be noted that, whereas a recording power is optimized using the gradient of a change in the above embodiment, an erasing power may be optimized in a similar manner. Specifically, a target recording power is calculated using the method described above, and the optimum erasing power Peo is then determined using parameter z1e and the following Expression:

$$Peo = z1e \cdot Pwt \quad (8)$$

wherein z1e is a parameter corresponding to z1, and generally z1e<z1.

In this embodiment, a target recording power is determined based on a change of a modulation degree m relative to a recording power Pw, that is, Δm/ΔPw. However, it is obvious to a person skilled in the art that, when a recording power Pw is changed by a constant level, a target recording power can also be determined with calculation of Δm alone according to the OPC technique. For example, for recording power shifting by 0.5 mW, such as 6 mW, 6.5 mW, 7 mW, 7.5 mW, and so forth, a point of inflection (see FIG. 5) and an extrapolation point (see FIG. 6) can be determined using solely a change Δm of a modulation degree m. In these cases also, a target recording power is determined based substantially on a change of a modulation degree relative to recording power.

In this embodiment, a target recording power is determined and then multiplied by a coefficient to determine the optimum recording power, and further erasing power. Erasing power, which can be determined based on the optimum recording power, can also be calculated based directly on the target recording power through multiplication using a coefficient. Alternatively, a target recording power may be multiplied by a coefficient to determine the optimum erasing power, which is then multiplied by another coefficient to determine the optimum recording power.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An optical disk apparatus, comprising:
   means for recording test data onto a predetermined area on an optical disk while changing a recording power level;

means for reproducing the test data to calculate a modulation degree for the recording power at each level; and means for setting an optimum recording power based on gradient of a change of the modulation degree relative to the recording power.

2. The optical disk apparatus according to claim 1, wherein the means for setting an optimum recording power sets the optimum recording power based on the recording power at a point at which the gradient of a change of the modulation degree relative to the recording power alters.

3. The optical disk apparatus according to claim 1, wherein
the means for setting an optimum recording power sets the optimum recording power by multiplying the recording power at a point at which the gradient of a change of the modulation degree relative to the recording power alters by a coefficient.

4. The optical disk apparatus according to claim 1, wherein the means for setting an optimum recording power sets the optimum recording power utilizing an area where the gradient of a change of the modulation degree relative to the recording power is relatively sharp.

5. The optical disk apparatus according to claim 4, wherein the means for setting an optimum recording power sets the optimum recording power based on a recording power for which the modulation degree is zero when calculated based on the gradient in the area.

6. The optical disk apparatus according to claim 4, wherein the means for setting an optimum recording power sets the optimum recording power by multiplying a coefficient and a recording power for which the modulation degree is zero when calculated based on the gradient in the area.

7. The optical disk apparatus according to claim 1, wherein the means for setting an optimum recording power further sets an optimum erasing power based on a gradient of a change of the modulation degree relative to the recording power.

8. An optical disk apparatus, comprising:
an optical pick-up for irradiating a laser beam onto an optical disk to record or reproduce data;
a signal processing circuit for detecting a modulation degree from a reproduced signal supplied from the optical pick-up; and
a controller for setting an optimum recording power based on the modulation degree to adjust laser beam power of the optical pick-up,
wherein
the optical pick-up records and reproduces test data with respect to the optical disk, using laser beam power at a plurality of levels,
the signal processing circuit detects a modulation degree with respect to laser beam power at each level, and
the controller sets a target recording power based on gradient of a change of the modulation degree relative to the laser beam power, and further sets the optimum recording power based on the target recording power.

9. The optical disk apparatus according to claim 8, wherein the controller sets the target recording power based on a point of inflection at which the gradient of a change of the modulation degree relative to the laser beam alters.

10. The optical disk apparatus according to claim 8, wherein the controller sets a target recording power for which the modulation degree is zero, through extrapolation using the gradient of change in an area where the gradient is sharp.

11. The optical disk apparatus according to claim 8, further comprising:
a memory for storing a parameter,
wherein
the controller sets the optimum recording power by multiplying the target recording power by the parameter stored in the memory.

12. An optical disk apparatus, comprising:
means for recording test data onto a predetermined area on an optical disk while changing a level of recording power;
means for reproducing the test data to calculate a $\gamma$ value for the recording power at each level; and
means for setting an optimum recording power based on gradient of a change of the $\gamma$ value relative to the recording power.

13. The optical disk apparatus according to claim 12, wherein the means for setting an optimum recording power sets the optimum recording power utilizing an area where the gradient of a change of the $\gamma$ value relative to the recording power is relatively sharp.

14. The optical disk apparatus according to claim 13, wherein the means for setting an optimum recording power sets the optimum recording power based on a recording power for which the $\gamma$ value, calculated based on the gradient in the area, is zero.

15. The optical disk apparatus according to claim 13, wherein the means for setting an optimum recording power sets the optimum recording power by multiplying a coefficient and a recording power for which the $\gamma$ value, calculated based on the gradient in the area, is zero.

16. The optical disk apparatus according to claim 12, wherein the means for setting an optimum recording power further sets an optimum erasing power based on the gradient of a change of the $\gamma$ value relative to the recording power.

17. An optical disk apparatus, comprising:
an optical pick-up for irradiating a laser beam to an optical disk to record or reproduce data;
a signal processing circuit for detecting a $\gamma$ value from a reproduced signal supplied from the optical pick-up; and
a controller for setting an optimum recording power based on the $\gamma$ value to adjust laser beam power of the optical pick-up,
wherein
the optical pick-up records and reproduces test data with respect to the optical disk, using laser beams at a plurality of power levels,
the signal processing circuit detects a $\gamma$ value with respect to laser beam power at each level, and
the controller sets a target recording power based on gradient of a change of the $\gamma$ value relative to the laser beam power, and further sets the optimum recording power based on the target recording power.

18. The optical disk apparatus according to claim 17, wherein the controller sets a target recording power for which the $\gamma$ value is zero, through extrapolation using the gradient of the change in an area where the gradient is sharp.

19. The optical disk apparatus according to claim 17, further comprises:
a memory for storing a parameter,
wherein
the controller sets the optimum recording power by multiplying the target recording power by the parameter stored in the memory.

* * * * *

UNITED STATES PATENT AND TRADEMARK OFFICE
CERTIFICATE OF CORRECTION

PATENT NO. : 7,050,374 B2  
APPLICATION NO. : 10/228620  
DATED : May 23, 2006  
INVENTOR(S) : K. Fukuchi et al.

Page 1 of 1

It is certified that error appears in the above-identified patent and that said Letters Patent is hereby corrected as shown below:

| COLUMN | LINE | ERROR |
|---|---|---|
| Title page, Item (56) Pg. 1, col. 2 | Refs. Cited (Foreign Pats., Item 1) | "40-10237" should read --4-10237-- |

Signed and Sealed this

Third Day of November, 2009

David J. Kappos  
*Director of the United States Patent and Trademark Office*